United States Patent [19]

Stan

[11] 4,348,898

[45] Sep. 14, 1982

[54] DIRECT READING TEMPERATURE AND CIRCUMFERENTIAL TIRE MONITOR

[75] Inventor: Aurel V. Stan, North Canton, Ohio

[73] Assignee: The Goodyear Tire & Rubber Company, Akron, Ohio

[21] Appl. No.: 120,242

[22] Filed: Feb. 11, 1980

[51] Int. Cl.³ .................. G01J 5/00; G01M 17/02
[52] U.S. Cl. ........................ 374/124; 250/358.1; 374/128; 374/129
[58] Field of Search .............. 73/355 R; 250/358 T

[56] References Cited

U.S. PATENT DOCUMENTS

| | | | |
|---|---|---|---|
| 2,846,882 | 8/1958 | Gray | 73/355 EM |
| 3,539,807 | 11/1970 | Bickel | 250/338 |
| 3,727,054 | 4/1973 | Herrick | 250/358 T |
| 3,807,226 | 4/1974 | Williams | 73/355 R X |
| 3,854,336 | 12/1974 | Bibby | 73/355 R X |
| 3,872,715 | 3/1975 | Pittaro | 73/609 X |
| 3,919,882 | 11/1975 | Wells | 73/146 |
| 4,001,497 | 1/1977 | Bosworth | 73/355 R X |
| 4,121,459 | 10/1978 | MaCall et al. | 73/355 R X |
| 4,174,705 | 11/1979 | Buchner | 73/609 X |

OTHER PUBLICATIONS

Publ. "AGA Thermovision 680 Operating Manual", Sections 3 and 5, ThV 680 Oper. Man. 7010, 1975.

*Primary Examiner*—Daniel M. Yasich
*Attorney, Agent, or Firm*—T. P. Lewandowski

[57] ABSTRACT

An infrared scanner for sensing temperature is presented with the inclusion of a meter providing a digital read-out of the temperature. The scanner utilizes an infrared detector, scanning a field including a reference of known temperature and an object of unknown temperature. The scan is performed by a raster controlled by a horizontal oscillator and a vertical sweep circuit. During the scan, video signals are emitted from a video amplifier, which signals correspond to the temperature of objects within the raster. Delay circuits are provided in interconnection between the video amplifier, horizontal oscillator, and vertical sweep circuit for isolating video signals corresponding to the temperature of the reference and the object. A logarithmic amplifier receives such video signals and produces an output indicative of the temperature of the object as a function of the temperature of the known reference. A digital volt meter receives the output of the logarithmic amplifier and presents a digital read-out of the temperature of the object.

16 Claims, 3 Drawing Figures

DIRECT READING TEMPERATURE AND CIRCUMFERENTIAL TIRE MONITOR

BACKGROUND OF THE INVENTION

The instant invention resides in the art of infrared scanners for determining the temperature of an unknown element by comparison with the temperature of a known or reference element. More particulary, the invention relates to a digital read-out for such scanners.

There are presently known a number of infrared scanners, commonly denoted as "thermo-vision," which fundamentally comprise a closed-channel television utilizing infrared light rather than white light for the desired imagery. The television incorporates an infrared detector, preferably of indium antimonide, which produces on a CRT a view of an object being monitored with "hot" and "cold" spots being denoted by different shades of gray. Gray scales are well known in the art of infrared thermal detectors for producing a thermal picture with hotter regions being progressively whiter and colder regions progressively darker, with all conceivable shades of gray therein between.

Typical of previously known thermal scanners is the model 680 Thermo Vision, as described in "AGA Thermo Vision 680 Operating Manual," published and copyrighted in 1975, and bearing manual number 7010, describing a thermal scanner system manufactured and marketed by AGA INFRARED SYSTEMS AB of Lidingo, Sweden. Such a scanner is of the type described herein and includes a number of options broadening the functional capabilities thereof. For example, the CRT of the infrared scanner may provide an image in color with the various colors of the spectrum relating to the temperature of corresponding areas of the object being viewed. While the color feature reduces the problem inherent in reading a gray scale and determining temperature from various shades of gray, it also has inherent drawbacks in that color ranges associated therewith are evidenced by various shades of color which, again, must be discussed by the eye.

Other features of the thermal scanner to particularly adapt the same for use in sensing temperature anomalies in a tire include the temperature profile adapter which enables the scanning lines composing the normal gray tone thermal picture to be simultaneously displayed on a separate monitor. Yet further, the entire scanning raster may be produced on the CRT to provide a thermal relief map of the temperature variations in the object being scanned, with one signal path in the relief map being produced for each raster line. Finally, with the profile adapter one is capable of running multiple profiles in such a manner as to superimpose all raster lines on top of each other, enabling the user to find the highest temperature point in the entire object by comparing the peak of each raster line with the peak of all other raster lines. It should be appreciated that with the profile adapter, one can run a single raster profile of the subject, a multiple raster profile thereof, or may actually construct a thermal relief of the same.

In known thermal scanners, such as the model 680 Thermo Vision, temperatures are measured by comparing a desired temperature spot in the video image with a known black body temperature reference source in the same field. There is a gray scale at the bottom of the screen which varies in brightness from black on the left to white on the right. There are two videos markers on the screen, one highlighting the reference and the other highlighting the temperature spot to be measured. A calculation is performed based on the distance of the markers from each other and the gain setting of the video amplifier. The result is then correlated to a non-linear curve representative of the response of the indium detector for a given lens opening. Additionally, the reference temperature established by the black body must be in the range of the gray scale in order to get a reading. The operator must also have at his disposal a variable reference with a very large range. Indeed, the prior known systems have required that the black body reference be in the visible range, requiring that such reference be dictated by the adjusted system gain, the black body tracking the sensitivity setting in order that a reading may be obtained. In a very sensitive area, the black body would have to be very close to the target temperature, requiring that the operator sacrifice accuracy for ease of operation.

OBJECTS OF ASPECTS OF THE INVENTION

In light of the foregoing, it is an object of a first aspect of the invention to provide a direct reading temperature and circumferential tire monitor which provides a digital read-out giving near absolute values of temperature without the approximations of using charts, eyeing differences on a CRT, or making numerous adjustments of system gain and sensitivity.

Yet another object of an aspect of the invention is to provide a direct reading temperature and circumferential tire monitor wherein the operating range of a thermal scanner is expanded to provide a reading even when the thermal reference is not visibly discernible on the CRT.

Yet another object of an aspect of the invention is to provide a direct reading temperature and circumferential tire monitor wherein a thermal scanner is controlled to facilitate the isolation of a thermal reference and the object to be scanned upon the CRT itself.

Still another object of an aspect of the invention is to provide a direct reading temperature and circumferential tire monitor which is easily achieved by modification of presently existing thermal scanners and which results in an apparatus highly reliable in operation, while being relatively inexpensive to implement.

SUMMARY OF THE INVENTION

The foregoing and other objects of aspects of the invention which will become apparent as the detailed description proceeds are achieved by a thermal scanner having an infrared detector and a video amplifier for sensing an object of unknown temperature and a reference of known temperature and presenting output signals corresponding to said temperatures, and a monitor connected to the video amplifier and controlled by a horizontal oscillator and a vertical sweep circuit for creating a raster scan of the object and reference, the improvement, comprising: first delay means interconnected between the video amplifier, horizontal oscillator, and vertical sweep circuit for selecting a first video signal from the raster scan indicative of the temperature of the reference; second delay means interconnected between the video amplifier, horizontal oscillator, and vertical sweep circuit for selecting a second video signal from the raster scan indicative of the temperature of the object; and circuit means connected to said first and second delay means, receiving said first and second video signals and producing therefrom an electrical signal indicative of the temperature of the object as a function of said first and second video signals.

DESCRIPTION OF DRAWINGS

For a complete understanding of the objects, techniques, and structure of the invention, reference should be had to the following detailed description and accompanying drawings wherein.

DETAILED DESCRIPTION OF PREFERRED EMBODIMENT

Figure 1:
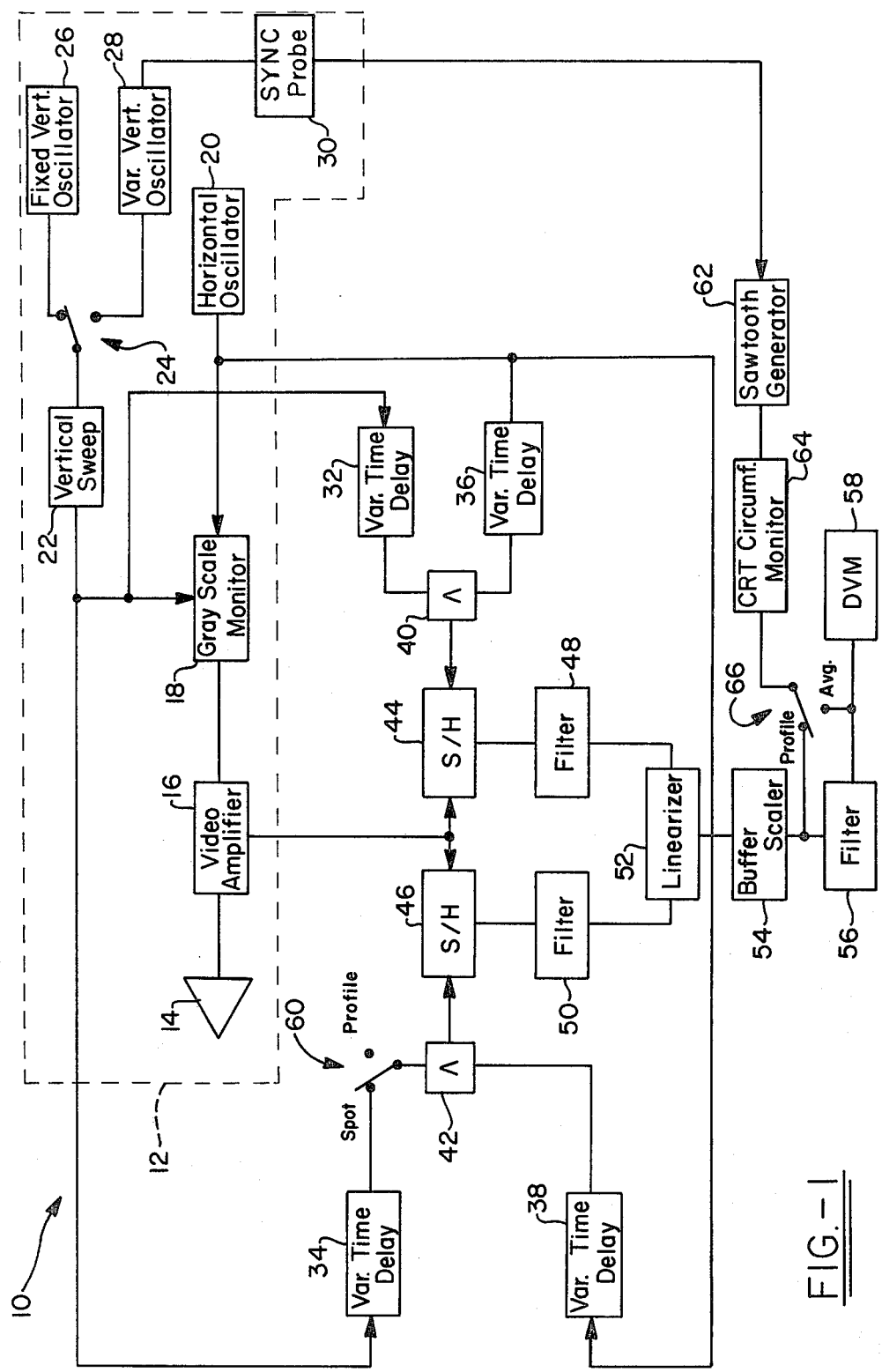
FIG. 1 is a schematic block diagram of the circuitry of the invention illustrating its interconnection with a state-of-the-art thermal scanner.

Referring now to the drawings and more particularly FIG. 1, it can be seen that a direct reading temperature and circumferential tire monitor according to the invention is designated schematically by the numeral 10. The monitor 10 includes a thermal scanner 12 which may be of the type presented hereinabove as the model 680 Thermo Vision. The scanner 12 includes an infrared detector 14, preferably of the indium antimonide type, which communicates in standard fashion with a video amplifier 16. The amplifier 16 presents a video output signal to the gray scale monitor 18 which is controlled in standard fashion by horizontal and vertical oscillators. As shown, a horizontal oscillator 20 of fixed frequency is provided as the internal horizontal oscillator. The vertical sweep of the monitor 18 is controlled by the vertical sweep circuit 22 which comprises a set of amplifiers communicating via the switch 24 with either a vertical oscillator 26 of fixed frequency or a variable oscillator 28 of selectable frequency. Further, and as shown, a sync probe 30 is included in the scanner 12 for synchronizing the variable oscillator 28 with an external source, for example, a mark on a rotating tire which is being scanned.

The vertical sweep signal from the circuit 22 is communicated to variable time delay circuits 32,34. Similarly, the output of the horizontal oscillator 20 is communicated to variable time delay circuits 36,38. The variable time delay circuits 32,34 may be adjusted so that the coincidence of output signals therefrom at the AND gate 40 denote the position of a black body reference of known temperature. At the coincidence of such signals, an output from the gate 40 enables the sample/hold circuit 44 to receive the output of the video amplifier 16 which is a signal indicative of the temperature of the black body reference sensed by the infrared detector 14.

In similar fashion, the variable time delay circuits 34,38 may be adjusted such that the coincidence of signals therefrom will occur at the point in the video raster at which the body whose temperature is to be determined is positioned. At such coincidence the AND gate 42 enables the sample/hold circuit 46 to receive the output signal from the video amplifier 16 indicative of the temperature of the body in interest.

The outputs of the sample/hold circuits 44,46 are passed through respective filters 48,50 to the linearizer 52. As is known in the art, the relationship between the voltage output signal of the video amplifier 16 and the temperature sensed by the infra-red detector 14 is an expontential one. Further, infrared detectors such as the detector 14 are typically unstable, with the voltage versus temperature curve thereof shifting with time. However, the shift is typically the same for both the reference signal and the signal generated by the object whose temperature is to be determined such that the voltage differential between the two will be constant for any given temperature differential irrespective of the instability of the output signal itself. By passing the output signal through a linearizer 52, which may typically cmprise an analog amplifier, the difference in relationship may be established such that the output signal of the amplifier 52 bears a fixed linear relationship to the difference in temperatures between the reference black body and the subject being sensed. The output of the linearizer 52 is passed to a buffer/scaler 54 which scales the signal from units of volts to units of temperature. This signal is then passed to a filter 56 which averages variations in the output signal from the circuit 54 such that the digital volt meter 58 may produce a visually observable output indicating the temperature in degrees of the body whose temperature is being monitored.

It should be noted that the output of the variable time delay circuit 34 may be removed from effecting the gate 42 by means of a switch 60. As can be seen, when a particular spot is of interest in the video raster, the switch 60 may be left in the position shown such that the conicidence of vertical and horizontal signals may pinpoint the exact spot in interest. If, however, a complete vertical scan of the subject, such as a tire, is desired, a switch 60 may be placed in the profile mode such that the profile of the object along a vertical line defined by the time delay selected by means of the circuit 38 is obtained. The profile is achieved by virtue of the fact that the vertical sweep signal plays no part in enabling the sample/hold circuit 46, but is turned on for a fixed period of time in each horizontal raster scan by means of the delay circuit 38. When the system of FIG. 1 is used for monitoring a rotating tire, for example, a saw-tooth generator 62 may be synchronized with the sync probe 30 which may be actuated, for example, by a piece of tape on the rotating tire. Sensing of the tape is used for emitting a sync pulse. The output of the saw-tooth generator 62 controls the horizontal input to a CRT of the circumferential monitor 64. The vertical input may be received via the switch 36 as either the varying output from the buffer/scaler 54 to provide a thermal profile of the rotating tire or it may be taken from the output of the filter 56, in which case the vertical signal on the CRT 64 would be the average temperature of the area scanned as determined by the circuits 34,38 and the positioning of the switch 60.

Figure 2A:
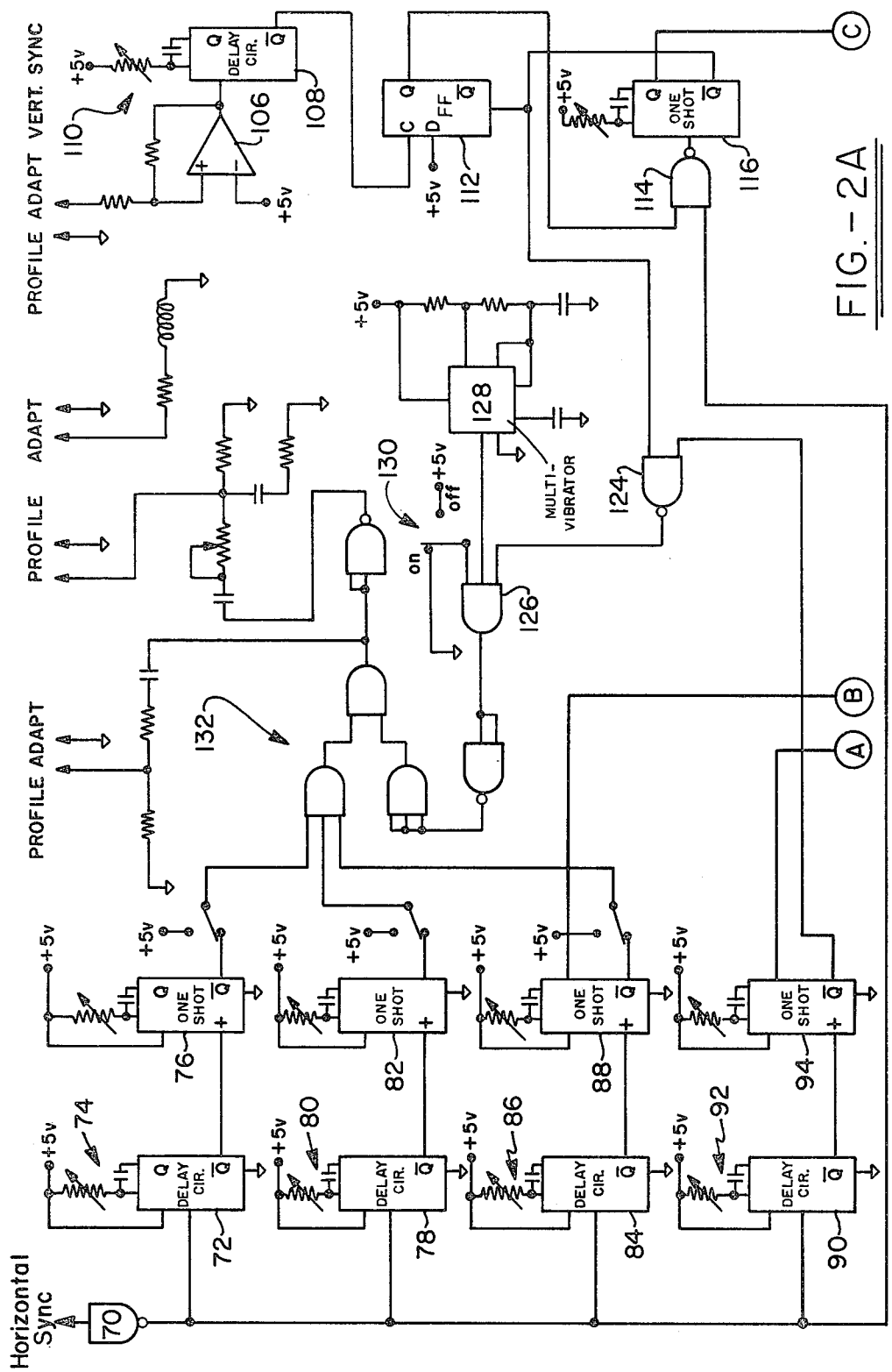
FIGS. 2A and 2B, taken together comprise a detailed circuit schematic of the circuitry of FIG. 1.
Figure 2B:
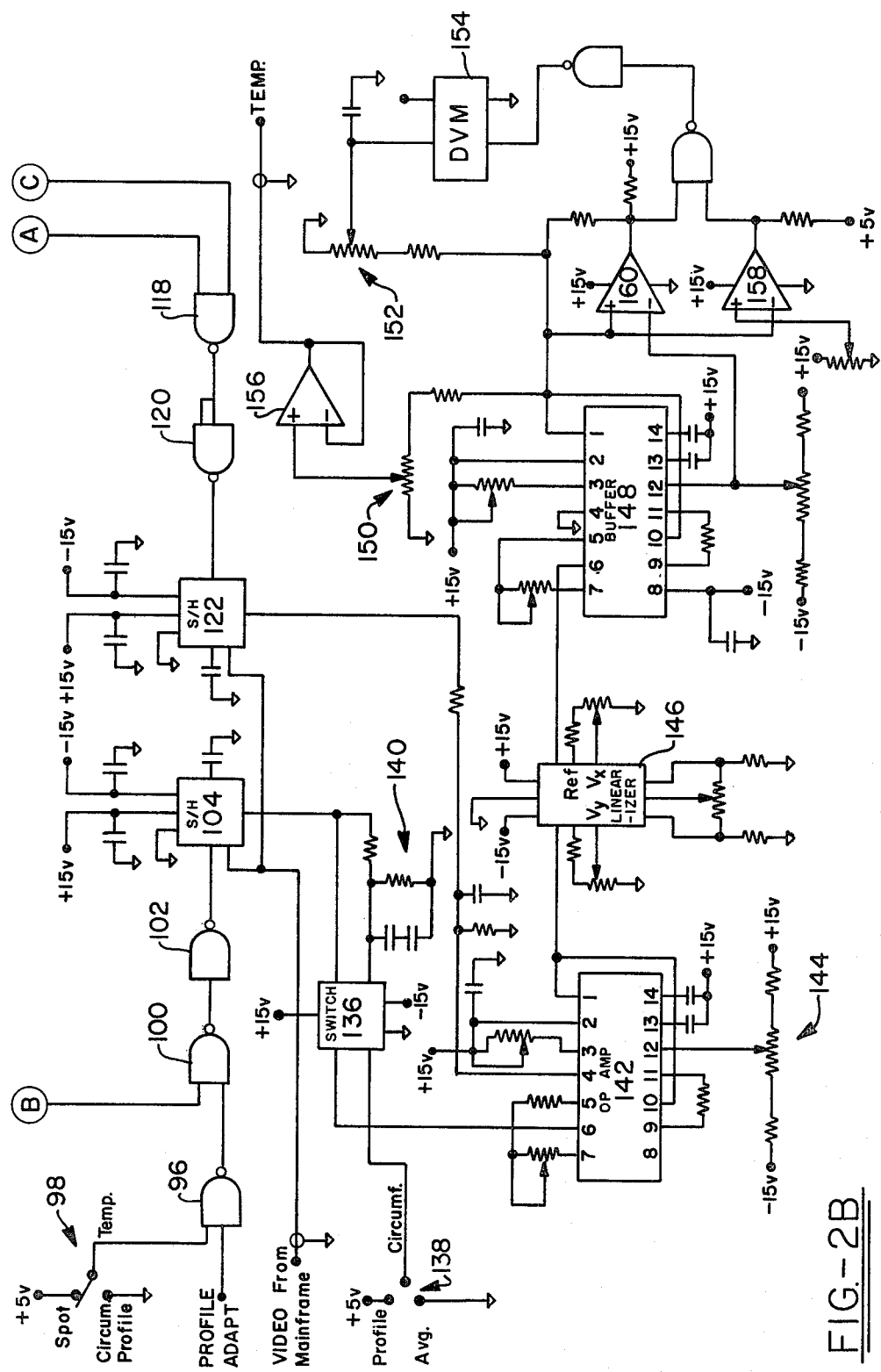

With reference now to FIGS. 2A and 2B, it can be seen that a gate 70 receives a horizontal sync pulse from the scanner 12 at the start of each horizontal sweep of the raster. The output of the gate 70 is passed through a delay circuit 72 having an adjustable delay by means of the potentiometer 74. Accordingly, there is an output signal presented from the delay circuit 72 at a time following an output from the gate 70 dependent upon the adjustment of the potentiometer 74. This output signal is passed to the one-shot 76 which presents an output signal of fixed time duration in standard fashion. Similarly, the delay circuit 78, potentiometer 80, and one-shot 82 function to present an output signal of fixed width or duration at a predetermined time following the triggering of the horizontal sweep. In use, the potentiometers 74,80 are used for aligning the left edge and right edge, respectively, of the tire or other object being monitored on the CRT of the scanner 12. In other words, the potentiometer 74 is adjusted until a bright vertical line is brought into registration with the left edge of the tire, and a similar adjustment is made via the pot 80 until a bright vertical line is presented on the CRT in alignment with the right edge of the tire. These two vertical lines then define the geometric boundaries of the tire or other object being monitored or scanned.

Similar to the circuits just discussed, a delay circuit 84, potentiometer 86, and one-shot 88 are provided for allowing the user to bring a vertical line into alignment with the point on the tire to be monitored. Finally, the delay circuit 90, potentiometer 92, and one-shot 94 may be used for bringing a vertical line into alignment with the black body utilized for a reference temperature by the scanner 12.

The thermal scanner 12 includes means for selecting individual horizontal raster lines. By means of a dial, the user may select to illuminate one particular horizontal scan line of the raster. When that scan line is activated, a pulse is emitted by the scanne 12 to the gate 96. The other input to the gate 96 is connected to the switch 98 which is operative for selecting a circumferential profile of the tire along a vertical line selected by means of the elements 84–88, or selecting a particular point on the tire as defined by the intersection of the vertical line defined by the elements 84–88 and the horizontal line producing a pulse input to the gate 96. As can be seen, the circumferential profile mode of the switch 98 clamps the output of the gate 96, while the spot selection of the switch 98 allows the gate 96 to emit a pulse during the scan of the selected horizontal line. In either event, the output of the gate 96 is coupled with the output of the one-shot 88 at the gate 100, the output of which is inverted by means of the inverter 102 which, in turn, is applied to enable the sample/hold circuit 104. It will now be appreciated that this sample/hold circuit correlates with the circuit 46 presented in FIG. 1.

The sample/hold circuit 104, when enabled by the output of the gate 102, receives as an input the output from the video main frame of the scanner 12. In other words, the sample/hold circuit 104, which is fundamentally a gate, receives a video signal corresponding to the temperature of the object being scanned at the point in the raster defined by the intersection of the horizontal line input to the gate 96 and the delay defined by the elements 84–88. In other words, elements 84–88 and 96–98 function as the delay means for allowing the operator to select a video signal, from the raster of the scanner 12, indicative of the temperature of the object being sensed. The object being sensed is, of course, at the intersection of the horizontal line input to the gate 96 and the delay defined by the elements 84–88.

With further reference to FIGS. 2A and 2B, it can be seen that the operational amplifier 106 receives a pulse from the scanner 12 when the vertical trace of the raster begins. The output of the amplifier 106 is passed to a delay circuit 108, having a characteristically adjustable delay by means of the potentiometer 110. This potentiometer allows the user to pick up or illuminate on the CRT the desired horizontal raster line. The output of the delay circuit 108 is passed to a D-type flip-flop 112, the output of which is passed to the gate 114. Another input to this gate is provided from the output of the gate 70 which is a pulse presented at the beginning of the horizontal sweep. Accordingly, there is an output of the gate 114 at the beginning of the selected horizontal raster line, which pulse triggers the one-shot 110 which produces an output signal of duration equal to the scan time of the horizontal raster line.

The output of the one-shot 116 being on for the duration of the horizontal raster line selected by the potentiometer 110, is applied to an input of the gate 118. The other input to the gate 118 is from the one-shot 94, the timing of which is determined by the potentiometer 92. Accordingly, there is an output pule from the gate 118 and inverter 120 at the intersection point of the horizontal line selected by potentiometers 110 and 92, this point being where the black body reference is positioned in the raster. Accordingly, the sample/hold circuit 122 is enabled at such time to receive the video input signal from the video main frame of the scanner 12, being indicative of the temperature of the black body reference.

Thus, circuit elements 90–94 and 100–120 function as delay means to allow the operator to isolate and select, from the raster of the scanner 12, a video signal which is indicative of the temperature of the black body reference. These delay means achieve the requisite selection by the intersection of both vertical and horizontal delays as discussed directly above.

It will also be seen that the outputs of the one-shots 94 and 116 are also applied to the gate 124. This gate presents output signals at the time determined by the adjustment of potentiometers 110 and 92 and defines the horizontal and vertical lines used for providing the intersection at the black body reference and for isolating the same. It will be seen that the output of the gate 124 is passed to the gate 126 which also receives an output from the multivibrator 128. A switch 130 is used for enabling the gate 126. When enabled, a pulsating output is provided from the gate 126 which provides adjustable horizontal and vertical lines in the raster which blink at a rate determined by the multivibrator 128. This allows the user to readily identify the horizontal and vertical lines to be used for isolating the black body reference on the CRT screen. It will be noted that this signal, along with the outputs from the one-shots 76,82,88 are passed through the circuitry 132 to the profile adapter of the scanner 12 for the purpose of presenting such video signals on the CRT. The profile adapters are standard equipment on the Thermo Vision 680 and, as shown in the circuitry of FIGS. 2A and 2B, receive signals for defining the left edge of the tire, the right edge of the tire, the vertical alignment of the spot to be monitored, and the horizontal and vertical alignments of the reference. As previously discussed, the horizontal alignment of the spot to be monitored is achieved by an adjustment provided on the scanner 12 which presents an input signal to the gate 96.

The outputs from the sample/hold circuits 104,122, which correspond to the circuits 46,44, respectively, are gated by means of a switch 136 which, in turn, is controlled by the switch 138. The switch 138 corresponds to the switch 66 of FIG. 1 and is operative for including or bypassing the filter 140 in the circuit path of the input of the sample/hold 104. As previously discussed, the output of the sample/hold 104 is the video signal corresponding to the temperature of the point in interest. Again, with reference to FIG. 1, the filter 140 would correspond to the element 50. In either event, the operational amplifier 142 receives the outputs of the sample/hold circuits 104,122, the same being respectively passed to the positive and negative inputs thereof. A voltage offset provided by the voltage divider 144 assures that the output of the operational amplifier 142 is always at a positive level.

The output of the amplifier 142 is passed to the linearizer 146 which is characterized by a logarithmic transfer function. It will be appreciated that the output of the operational amplifier 142 is a voltage indicative of the difference in temperature between the black body reference and the object being sensed. As discussed above, the variation between voltage differentials and temperature differentials for the black body reference and the object being sensed, bears an exponential relationship. Accordingly, with the linearizer 146 having a logarithmic transfer function, the difference in temperature between the reference and the object and the resulting difference in voltage signals produced thereby take on a linear relationship to each other.

As can be seen, the operational amplifier 142, linearizer 146, and buffer 148, comprise circuit means for generating an electrical signal indicative of the temperature of the unknown object as a function of the video signals maintained by the sample/hold circuits 104,122. It will further be appreciated that, taken together, the operational amplifier 142 and linearizer 146 function as a logarithmic amplifier since the linearizer 146 includes a logarithmic transfer function.

The voltage output of the linearizer 146 is passed to the scaler and buffer 148 which is basically an operational amplifier. Potentiometers 150,152, connected to the amplifier 148, are used for adjusting the output signal from the amplifier 148 to achieve correlation between the voltage signal and the temperature of the object being sensed. For example, the output which is passed to the digital volt meter 154 may be adjusted by means of the potentiometer 152 such that 98.6° would read 0.986 volts on the digital volt meter 154. Similar adjustment is made by the potentiometer 150 for the output of the amplifier 156 which is used for feeding auxiliary equipment such as a scope or the like. Accordingly, the digital volt meter 154 is calibrated such as to provide a direct reading of the temperature of the unknown object.

Finally, it should be noted that comparators 158,160 are used for providing a window in which the temperature of the object must lie before an output signal will be passed to enable the digital volt meter 154. This window may be designed for the operative range of the infrared detector utilized by the scanner 12. As is well known to those skilled in the art, by appropriately biasing the positive input of the comparator 158 and the negative input of the comparator 160, the window is defined. In the instant situation, the variable resistor biasing the positive input of the comparator 158 sets an upper threshold for the window, while the variable resistor biasing the negative input of the comparator 160 sets a lower threshold for the window.

It should now be apparent that there is presented a system in which a thermal scanner is used in rather standard fashion to determine the temperature of an unknown body by reference to the known temperature of a reference body. The circuitry provided herein allows the user to isolate both the reference and the object by means of adjustable horizontal and vertical alignment means within the raster. It also allows the user, if he desires, to monitor a complete vertical line within the raster for monitoring, for example, the profile of a tire as it is rotating within the range of the scanner 12. In either event, the video signal of the scanned object is compared with the video signal of the known reference temperature, the difference is linearized and scaled, and the output is then adapted for application to a digital read-out means, eliminating the need for reference to charts and the like. Additionally, means are provided for presenting the output signal to an oscilloscope or the like for monitoring of the profile.

Thus it can be seen that the objects of the invention have been satisfied by the structure and techniques presented hereinabove. While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. In a thermal scanner having an infrared detector and a video amplifier for sensing an object of unknown temperature and a reference of known temperature and presenting output signals corresponding to said temperatures, and a monitor connected to the video amplifier and controlled by a horizontal oscillator and a vertical sweep circuit for creating a raster scan of the object and reference, the improvement, comprising:

first delay means interconnected between the video amplifier, horizontal oscillator, and vertical sweep circuit for selecting a first video signal from the raster scan indicative of the temperature of the reference, said first video signal occurring at a coincidence of first outputs from the horizontal oscillator and vertical sweep circuit;

second delay means interconnected between the video amplifier, horizontal oscillator, and vertical sweep circuit for selecting a second video signal from the raster scan indicative of the temperature of the object, said second video signal occurring at a coincidence of second outputs from the horizontal oscillator and vertical sweep circuit;

circuit means connected to said first and second delay means, receiving said first and second video signals and producing therefrom an electrical signal indicative of the temperature of the object as a function of said first and second video signals; and third and fourth delay means operatively connected to said horizontal oscillator for defining within the raster scan the physical boundaries of the object of unknown temperature.

2. The improvement in a thermal scanner as recited in claim 1 wherein said circuit means comprises an amplifier having a logarithmic transfer function, said amplifier linearizing the difference between said first and second video signals.

3. The improvement in a thermal scanner as recited in claim 2 which further includes a meter operatively connected to said amplifier and receiving therefrom said electrical signal, said meter presenting an output indicative of the temperature of the object.

4. The improvement in a thermal scanner as recited in claim 3 in which said meter comprises a digital volt meter.

5. The improvement in a thermal scanner as recited in claim 4 which further includes limit means interconnected between said meter and said amplifier for establishing upper and lower threshold levels for said electrical signal and enabling said meter when said electrical signal lies between said threshold levels.

6. The improvement in a thermal scanner as recited in claim 1 which further includes multivibrator means connected to said first delay means for oscillating gating said selected first video signal.

7. The improvement in a thermal scanner as recited in claim 1 wherein said first and second delay means each comprise a one-shot connected to and receiving an output from an adjustable delay circuit, said output being delayed by a potentiometer in said adjustable delay circuit.

8. A direct reading temperature and time monitor for sensing the temperatures of a reference of known temperature and an object of unknown temperature and producing video signals corresponding to such temperatures on a video monitor having a raster scan of the reference and object, created by a horizontal oscillator and vertical sweep circuit, comprising:

first delay means interconnected between the horizontal oscillator and vertical sweep circuit for selecting a first video signal from the raster scan indicative of the temperature of the reference;

second delay means interconnected between the horizontal oscillator and vertical sweep circuit for selecting a second video signal from the raster scan indicative of the temperature of the object;

a logarithmic amplifier connected to said first and second delay means and receiving said first and second video signals and presenting a linearized voltage output corresponding to a difference therebetween;

a meter connected to said logarithmic amplifier, receiving said linearized voltage output and registering the temperature of the object as a function of said linearized voltage output; and a threshold circuit means connected to and receiving said linearized voltage output from said logarithmic amplifier for enabling said meter only when said linearized voltage output falls between first and second threshold levels.

9. The monitor according to claim 8 which further includes a filter between said logarithmic amplifier and said meter, said filter averaging said linearized voltage output.

10. The monitor according to claim 8 wherein said second delay means includes a switch operatively connected to the vertical sweep circuit for selectively applying and removing the interconnection of the vertical sweep circuit with said second delay means.

11. In a thermal scanner having an infrared detector and a video amplifier for sensing an object of unknown temperature and a reference of known temperature and presenting output signals corresponding to said temperatures, and a monitor connected to the video amplifier and controlled by a horizontal oscillator and a vertical sweep circuit for creating a raster scan of the object and reference, the improvement, comprising:

first delay means interconnected between the video amplifier, horizontal oscillator, and vertical sweep circuit for selecting a first video signal from the raster scan indicative of the temperature of the reference, said first video signal occurring at a coincidence of first outputs from the horizontal oscillator and vertical sweep circuit;

second delay means interconnected between the video amplifier, horizontal oscillator, and vertical sweep circuit for selecting a second video signal from the raster scan indicative of the temperature of the object, said second video signal occurring at a coincidence of second outputs from the horizontal oscillator and vertical sweep circuit;

circuit means connected to said first and second delay means, receiving said first and second video signals and producing therefrom an electrical signal indicative of the temperature of the object as a function of said first and second video signals;

a meter operatively connected to said circuit means and receiving therefrom said electrical signal, said meter presenting an output indicative of the temperature of the object; and limit means interconnected between said meter and said circuit means for establishing upper and lower threshold levels for said electrical signal and enabling said meter when said electrical signal lies between said threshold levels.

12. The improvement in a thermal scanner as recited in claim 11 which further includes multivibrator means connected to said first delay means for oscillatingly gating said selected first video signal.

13. The improvement in a thermal scanner as recited in claim 11 wherein said first and second delay means each comprise a one-shot connected to and receiving an output from an adjustable delay circuit, said output being delayed by a potentiometer in said adjustable delay circuit.

14. The improvement in a thermal scanner as recited in claim 11 which further includes third and fourth delay means operatively connected to said horizontal oscillator for defining within the raster scan the physical boundaries of the object of unknown temperature.

15. The improvement in a thermal scanner as recited in claim 11 wherein said circuit means comprises an amplifier having a logarithmic transfer function, said amplifier linearizing the difference between said first and second video signals.

16. The improvement in a thermal scanner as recited in claim 11 in which said meter comprises a digital volt meter.

* * * * *